United States Patent
Ooki

(10) Patent No.: US 7,123,706 B2
(45) Date of Patent: Oct. 17, 2006

(54) COMMUNICATION EXCHANGING SYSTEM CAPABLE OF CHANGING FORWARDING DESTINATION ACCORDING TO NOTIFICATION OF PRESENCE CHANGE OF USER

(75) Inventor: Yasuomi Ooki, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 61 days.

(21) Appl. No.: 10/873,127

(22) Filed: Jun. 23, 2004

(65) Prior Publication Data

US 2005/0013426 A1      Jan. 20, 2005

(30) Foreign Application Priority Data

Jun. 24, 2003     (JP)     ............................. 2003-179001

(51) Int. Cl.
  *H04M 3/42*     (2006.01)
(52) U.S. Cl. ........................ 379/211.02; 379/207.04; 379/207.12; 379/211.01
(58) Field of Classification Search ........... 379/201.06, 379/201.07, 207.04, 207.05, 207.12, 211.01, 379/211.02
  See application file for complete search history.

(56) References Cited

U.S. PATENT DOCUMENTS

| | | | | |
|---|---|---|---|---|
| 5,243,645 A | * | 9/1993 | Bissell et al. | ........... 379/211.02 |
| 5,839,067 A | * | 11/1998 | Jonsson | ................... 455/432.3 |
| 5,901,359 A | * | 5/1999 | Malmstrom | ................. 455/461 |
| 5,905,789 A | * | 5/1999 | Will | ..................... 379/211.03 |
| 6,301,339 B1 | | 10/2001 | Staples et al. | |
| 6,404,874 B1 | * | 6/2002 | Chestnut | ................. 379/211.02 |
| 6,678,366 B1 | * | 1/2004 | Burger et al. | .......... 379/211.03 |
| 6,700,966 B1 | * | 3/2004 | Takagi et al. | .......... 379/201.06 |
| 7,035,923 B1 | * | 4/2006 | Yoakum et al. | ............. 709/224 |
| 2001/0036171 A1 | | 11/2001 | Tonnby et al. | |

FOREIGN PATENT DOCUMENTS

| | | |
|---|---|---|
| DE | 100 37 290 A1 | 2/2002 |
| EP | 0 484 067 A2 | 5/1992 |
| JP | 63-301658 | 12/1988 |
| JP | 5-316234 | 11/1993 |
| JP | 6-121046 | 4/1994 |
| JP | 2002-14923 | 1/2002 |
| WO | WO 01/45342 A2 | 6/2001 |
| WO | WO 02/11412 A1 | 2/2002 |

* cited by examiner

*Primary Examiner*—Bing Q. Bui
(74) *Attorney, Agent, or Firm*—Young & Thompson

(57) ABSTRACT

A communication exchanger has a memory which memorizes a presence state table for all of users and a forwarding destination table for each of the users. In the presence state table, presence information of all users is registered. In the forwarding destination table, forwarding destination information classified by each presence of the user is registered. Upon receiving a call, the exchanger retrieves the presence information of the corresponding user from the presence state table. The exchange further retrieves the forwarding destination information according to the presence information from the forwarding destination table to forward the call. When the presence information is rewritten, the forwarding destination of the call is changed without rewriting the forwarding destination information.

10 Claims, 14 Drawing Sheets

| PRESENCE INFORMATION | KIND OF FORWARDING DESTINATION | FORWARDING DESTINATION TELEPHONE NUMBER/ ADDRESS | SERVER ADDRESS | SERVER ACCOUNT |
|---|---|---|---|---|
| AT DESK | EXTENTION | 5330 | · | · |
| OUT OF OFFICE | OUTSIDE LINE E-MAIL | 09011112222 Suzuki@phs.com | · Mail.aaa.com | · ID:Suzuki Pass:0000 |
| IN COUNCIL | E-MAIL IM | Suzuki@aaa.com Suzuki@im.com | Mail.aaa.com im.aaa.com | ID:Suzuki Pass:0000 ID:Suzukiim Pass:1111 |
| ... | ... | ... | ... | ... |

FORWARDING DESTINATION TABLE

| PRESENCE STATE | KIND OF FORWARDING DESTINATION | FORWARDING DESTINATION TELEPHONE NUMBER/ ADDRESS | SERVER ADDRESS |
|---|---|---|---|
| AT DESK | EXTENTION | 5330 | . |
| OUT OF OFFICE | OUTSIDE LINE | 09011112222 | . |
| IN COUNCIL | E-MAIL | Suzuki@aaa.com | Mail.aaa.com |
| ... | ... | ... | ... |

FORWARDING DESTINATION TABLE

| USER'S ID NUMBER (501) | CALL BACK FLAG (502) | CALL BACK EXECUTION STATE FLAG (503) |
|---|---|---|
| abc001 | ON | ON |
| abc002 | OFF | OFF |
| abc003 | OFF | OFF |
| ... | ... | ... |

CALL BACK MANAGEMENT TABLE

Fig. 5

| USER'S ID NUMBER (601) | PRESENCE STATE (602) | IM ACCOUNT (603) | E-MAIL ACCOUNT (604) |
|---|---|---|---|
| abc001 | AT DESK | ...... | ...... |
| abc002 | ON PHONE | ...... | ...... |
| abc003 | OUT OF OFFICE | ...... | ...... |
| ... | ... | ...... | ...... |

PRESENCE STATE TABLE

Fig. 6

| 1101 | 1102 | 1103 | 1104 | 1105 |
|---|---|---|---|---|
| PRESENCE OF COMING TO OFFICE | PRESENCE OF LEAVING OFFICE | PRESENCE OF LEAVING SEAT | REFERENCE TIME OF LEAVING SEAT | VALUE OF COUNTER |
| LOG IN | AT HOME | OUT OF DESK | 360 SEC. | 158 SEC. |

USER'S DESK MANAGEMENT TABLE

| PRESENCE INFORMATION | KIND OF FORWARDING DESTINATION | FORWARDING DESTINATION TELEPHONE NUMBER/ ADDRESS | SERVER ADDRESS | SERVER ACCOUNT |
|---|---|---|---|---|
| AT DESK | EXTENTION | 5330 | . | . |
| OUT OF OFFICE | OUTSIDE LINE E-MAIL | 09011112222 Suzuki@phs.com | . Mail.aaa.com | . ID:Suzuki Pass:0000 |
| IN COUNCIL | E-MAIL IM | Suzuki@aaa.com Suzuki@im.com | Mail.aaa.com im.aaa.com | ID:Suzuki Pass:0000 ID:Suzukiim Pass:1111 |
| ... | ... | ... | ... | ... |

FORWARDING DESTINATION TABLE

Fig. 16

| KIND OF NOTIFYING DESTINATION | SERVER ADDRESS | SERVER ACCOUNT |
|---|---|---|
| MESSAGE BOARD | boad.aaa.com | ID:Suzuki<br>Pass :3333 |
| ... | ... | ... |

NOTIFYING DESTINATION GROUPWARE TABLE

US 7,123,706 B2

COMMUNICATION EXCHANGING SYSTEM CAPABLE OF CHANGING FORWARDING DESTINATION ACCORDING TO NOTIFICATION OF PRESENCE CHANGE OF USER

This application claims priority to prior Japanese Patent Application JP 2003-179001, the disclosure of which is incorporated herein by reference.

BACK GROUND OF THE INVENTION

This invention is relates to a communication exchanging system, in particular, to a communication exchanging system which can change a forwarding destination according to a notification of a presence change of a user.

There is a related private branch exchanger that can transfer a call for a first extension telephone of a user to a second extension telephone when a second extension telephone's number is registered beforehand therein as a forwarding destination of the first extension telephone. Such a private branch exchanger is disclosed in Unexamined Japanese Patent Publication No. 5-316234.

Furthermore, there is a related transfer system that can transfer a call for a first telephone of a user using a terminal device such as a personal computer to a second telephone according to a monitored result obtained by a presence/absence monitoring apparatus for monitoring input operation to the terminal device. Such a transfer system is disclosed in Unexamined Japanese Patent Publication No. 2002-14923.

Still furthermore, there is a related telephone exchanger that stores calling and called telephone numbers in its memory (i.e. designs to connect a calling telephone with a called telephone) when a user of a called telephone is absence. The telephone exchanger calls the both telephones having the memorized telephone numbers when both of a calling user and the called user are presence. Such a telephone exchanger is disclosed in each of Unexamined Japanese Patent Publication Nos. 63-301658 and 6-121046.

In addition, there is a related instant message communication system that notifies arrival of a message with a telephone related to a destination terminal of the message when the destination terminal is in an off line state. Such an instant message communication system is disclosed in Unexamined Japanese Patent Publication No. 2002-14923.

The first mentioned private branch exchanger clears the registration of the forwarding destination information when release operation of the forwarding is made. Therefore, it is necessary to register the forwarding destination information whenever the user leaves the user's desk. Thus, the private branch exchanger is inconvenience and frequently incurs input mistakes.

The second mentioned transfer system makes possible to control on/off of the forwarding operation according to the notification of the monitored result. However, it is difficult to realize the transfer system because it is not clear how to achieve the forwarding operation in the communication network concretely.

The third mentioned telephone exchanger designs to connect the calling telephone with the called telephone without attempt to transfer the call. Therefore, the telephone exchanger is inconvenience because it can not ensure emergency contact.

These three exchangers or system also have a problem that they are related to only telephone forwarding and not related to E-mail and instant massage. That is, these exchangers or system can not provide several alternatives for user's situation.

The fourth mentioned instant message communication system is formed for use at home (or in a place where the telephone and the destination terminal are collocated). Therefore, the instant message communication system merely urges the user to receive the instant message. The user can not know the contents of the instant message unless the user is in the vicinity of the destination terminal.

SUMMARY OF THE INVENTION

It is therefore an object of this invention to provide a communication exchanging system capable of changing a forwarding destination according to a notification of a presence change of a user.

It is another object of this invention to provide a communication exchanging system capable dealing with a telephone call, E-mail and an instant massage.

Other object of this invention will become clear as the description proceeds.

According to an aspect of this invention, a communication exchanging system comprises an exchanger for forwarding a call for a user to a forwarding destination. The exchanger automatically changes the forwarding destination according to notification of a presence change of the user.

The communication exchanging system may include a terminal connected to the exchanger for executing the notification of the presence change of the user automatically or manually.

Furthermore, the exchanger of the communication exchanging system may participates in an instant message service and monitors whether the user is logging in a instant message server providing the instant message service to detect the presence change according to a monitoring result.

The communication exchanging system can deal with a telephone call, E-mail and an instant message as the call and allows designating a telephone number, an E-mail address and an instant message address as the forwarding destination.

The exchanger of the communication exchanging system may notify the presence change to another apparatus. Therefore, presence information of the user in groupware is changed at the same time.

The exchanger may call back a destination terminal corresponding to the forwarding destination for the presence of "AT DESK" when the presence changes from not "AT DESK" to "AT DESK", in a case where a forwarded-to terminal corresponding to the forwarding destination for the presence of not "AT DESK" does not respond to a forwarded telephone call during a predetermined time period though a telephone call for the destination terminal is forwarded to the forwarded-to terminal as the forwarded telephone call.

According to another aspect of this invention, a communication exchanger comprises a presence receiving portion for receiving a presence information of a user. A memory is for memorizing a table in which forwarding destination information of a call for the user is registered so as to be classified by presence of the user. A forwarding portion is for retrieve the forwarding destination information from the table by the use of the presence information received by the presence receiving portion to forward the call to a forwarding destination represented by the forwarding destination information.

The communication exchanger may comprise a PSTN interface connected to a public switched telephone network.

An extension terminal interface is connected to an extension telephone terminal. An LAN interface is connected to an instant message server and a mail server through a local area network. An instant message client portion is for retrieving an instant message from the instant message server. An internal mail client portion is for retrieving E-mail from the mail server. A controller is for controlling the PSTN interface, the extension terminal interface, the LAN interface, the instant message client portion and the internal mail client portion. The communication exchanger deals with a telephone call, the E-mail and the instant message.

BRIEF DESCRIPTION OF THE DRAWING

FIG. 5 shows an example of a call-back management table memorized in the memory of the communication exchanger of FIG. 2;

FIG. 6 shows an example of a presence state table memorized in the memory of the communication exchanger of FIG. 2;

FIG. 16 shows a forwarding destination table for each user in a case where plural forwarding destinations are designated;

PREFERABDLE EMBODIMENTS

Figure 1:
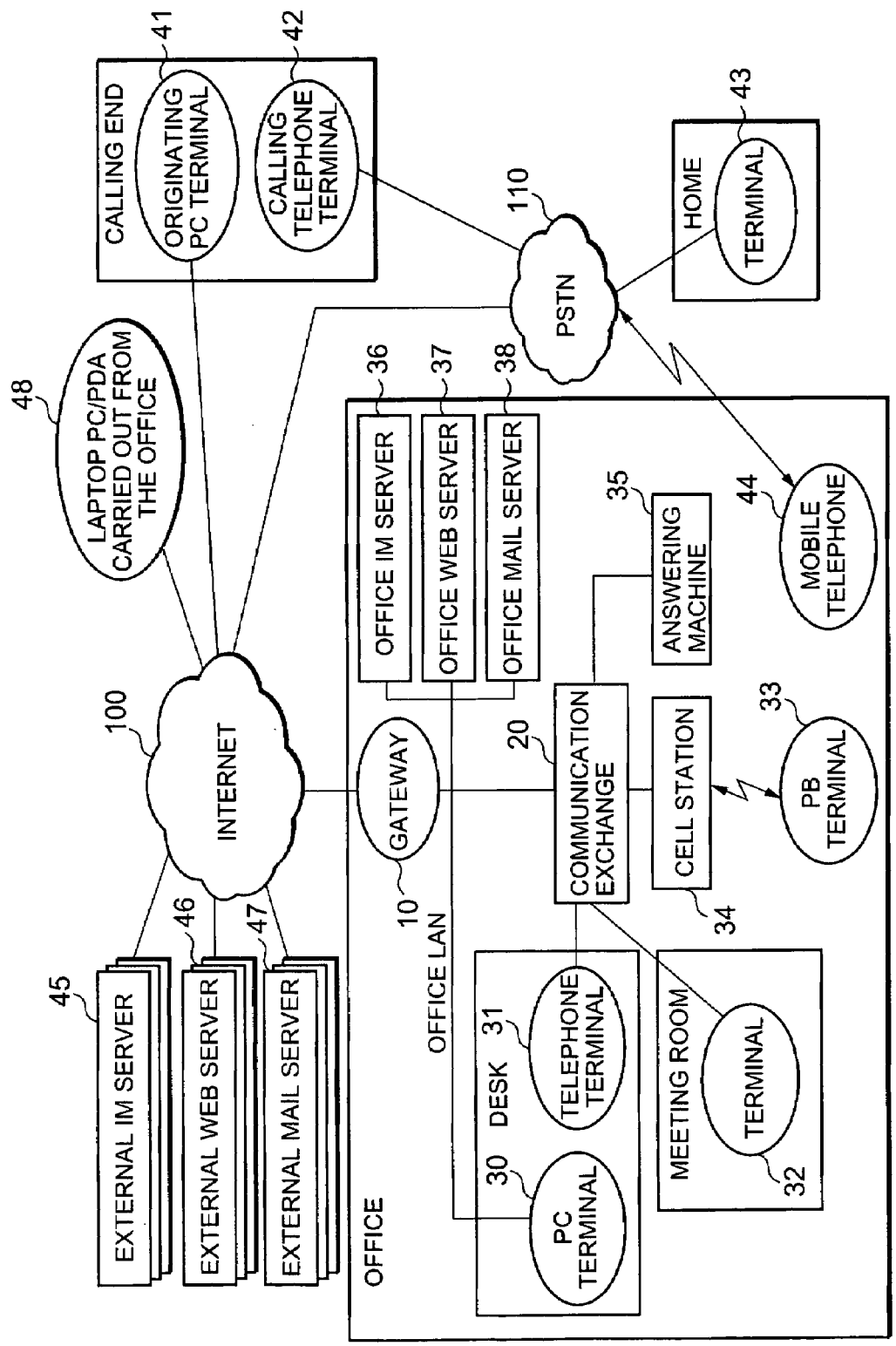
FIG. 1 is a block diagram showing a schematic structure of a communication exchanging system according to an embodiment of this invention.

Referring to FIG. 1, description will be at first directed to a communication exchanging system according to an embodiment of this invention.

As understood from FIG. 1, the communication exchanging system has a communication exchanger 20, which is arranged in an office, as a central part thereof. The system is characterized by automatically selecting suitable means of communication to forward a call, such as a telephone call, E-mail or an instant massage or the like, to a user with reference to a presence information of the user. The presence information represents user's presence (or whereabouts), such as at vicinity of user's desk, in a meeting room, or out of the office. For example, the system can forward the call addressed to a user's desk telephone terminal 31 to a mobile phone 44 when the user is out of the office. Furthermore, the system can forward the call to a private branch (PB) personal handy phone 33 when the user is not at user's desk though the user is in the office.

The illustrated communication exchanging system has the communication exchanger 20 connected to the Internet 100 through a gateway 10 and to the public switched telephone network (PSTN) 110.

The communication exchanger 20 is connected to a user's desk personal computer (PC) terminal 30 and a user's desk telephone terminal 31 which are assigned to each user and located on the user's desk. Though the only one set of the user's desk PC terminal 30 and the user's desk telephone terminal 31 is shown in FIG. 1, plural sets are generally connected to the communication exchanger 20 according to the number of users. The communication exchanger 20 is further connected to a meeting room's terminal 32, a cell station 34 which can communicate with the PB mobile terminal 33, an answering machine 35, an office instant messaging (IM) server 36, an office WEB server 37, and an office mail server 38.

The communication exchanger (hereinafter simply called the exchanger) 20 exchanges communication of a telephone call or message, E-mail, an instant message or the like. The exchanger 20 executes not only internal communication exchange in the office but also internal and external communication exchange among the terminals in the office and at the outside of the office. For example, the communication exchanger 20 connects an originating PC terminal 41 or a calling telephone terminal 42 to any one of the terminals in the office. The exchanger 20 furthermore fulfills communication exchange among terminals located in the office and in the outside of the office, servers located in the office and in the outside of the office, a home's terminal 43 (located in a home of each user) and a mobile terminal (i.e. a mobile phone, a personal handy phone or the like) 44. For example, the exchanger 20 allows the user's desk PC terminal 30 to access an external IM server 45, an external WEB server 46 and/or an external mail server 47 which are controlled by an internet service provider (ISP, not shown) or the like connected to the Internet 100. Furthermore, the exchanger 20 permits a laptop personal computer (PC) and/or a personal digital assistant (PDA) which are carried out of the office to access the office IM server 36 and so on in the office.

Figure 2:
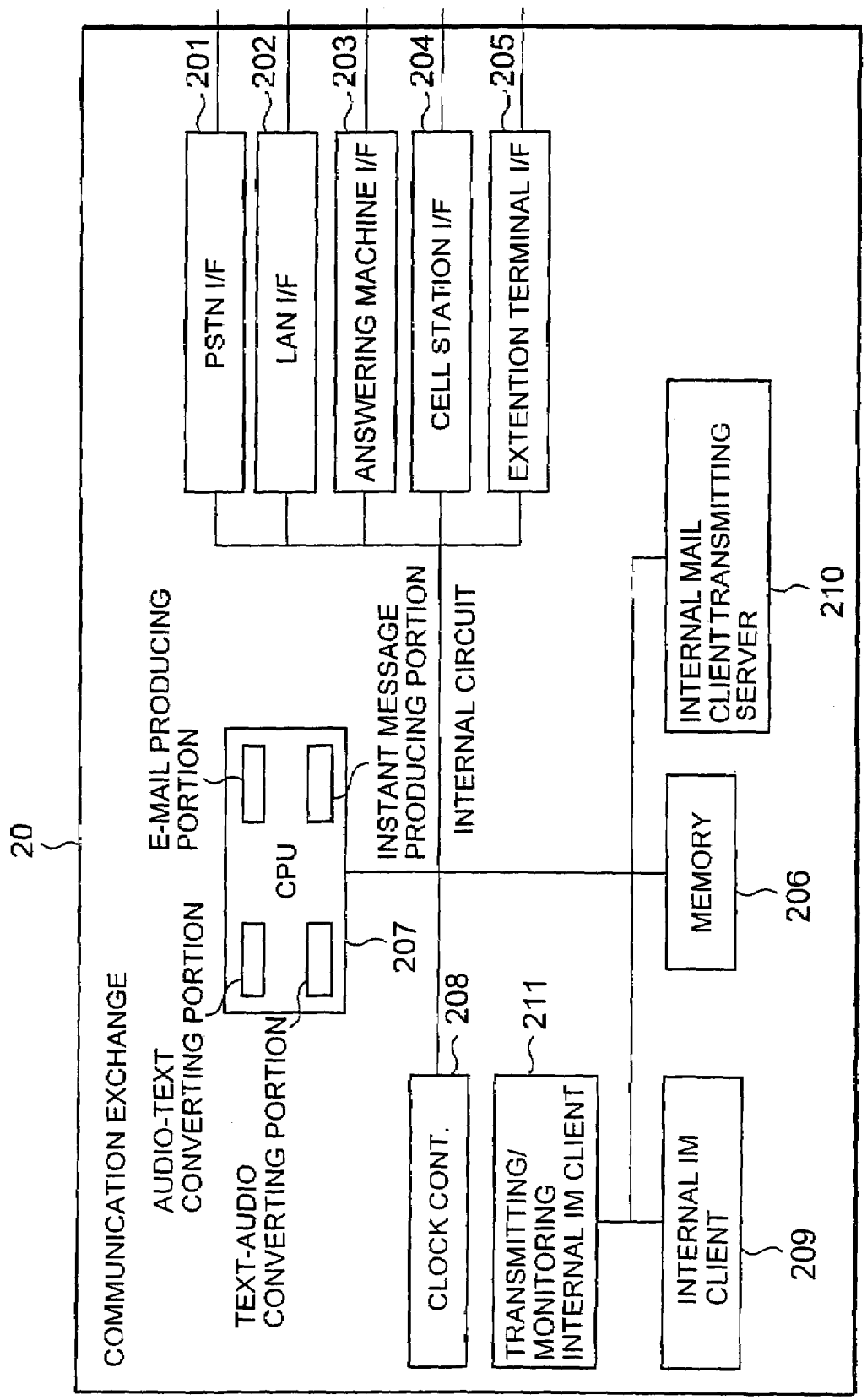
FIG. 2 is a block diagram of a communication exchanger used in the communication exchanging system of FIG. 1.

The exchanger 20 is composed as shown in FIG. 2 for instance. In FIG. 2, the exchanger 20 includes a PSTN interface 201, a LAN interface 202, an answering machine interface 203, a cell station interface 204, an extension terminal interface 205, a memory 206, a CPU 207, a clock control portion 208, an internal IM client portion 209, an internal mail client portion transmitting server 210, and a transmitting/monitoring internal IM client portion 211.

Each portion of the exchanger 20 roughly operates as follows.

The PSTN interface 201 transmits/receives communication control signals and audio signals to/from the PSTN 110. The LAN interface 202 transmits/receives data signals to/from the office LAN circuit. The answering machine interface 203 transmits/receives data signals to/from the answering machine 25. The cell station interface 204 transmits/receives data signals to/from the cell station 34. The extension terminal interface 205 transmits/receives communication control signals and audio signals to/from each internal stationary terminal, such as the user's desk PC terminal 30, the user's desk telephone terminal 31, the meeting room's terminal and so on. The memory 206 stores data necessary for controlling the whole exchanger 20. The CPU controls the whole exchanger 20. The CPU also serves as an audio-text converting portion, a text-audio converting portion, an E-mail producing portion, and an instant message producing portion. The clock control portion 208 controls internal time and synchronized signals of the exchanger 20. The internal IM client portion 209 transmits/receives data signals to/from the external IM server 45. The internal mail client portion transmitting server 210 transmits/receives data signals to/from the external mail server 47. The transmitting/monitoring internal IM client portion 211 logs in the external IM server 45 or the office IM server 36 to monitor login state of other users and/or to forward messages via the IM server 45 or 36.

Figures 3, 4:
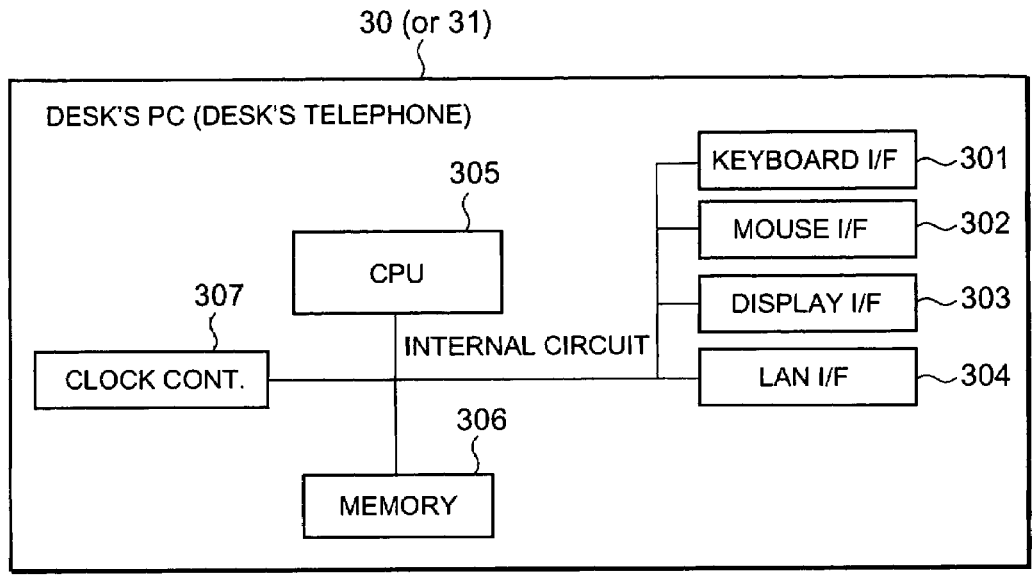
FIG. 3 is a block diagram of a user's desk personal computer terminal used in the communication exchanging system of FIG. 1.
FIG. 4 shows an example of a forwarding destination table of each user memorized in a memory included in the communication exchanger of FIG. 2.

The user's desk PC terminal 30 is composed as shown in FIG. 3 for instance. The user's desk telephone terminal 31 is composed as well as the user's desk PC terminal 30 when it is a multifunctional telephone.

In FIG. 3, the user's desk PC terminal 30 includes a keyboard interface 301, a mouse interface 302, a display interface 303, a LAN interface 304, a CPU 305, a memory 306 and a clock control portion 307.

Each portion of the user's desk PC terminal 30 roughly operates as follows.

The keyboard interface 301 receives input signals from a keyboard (not shown). The mouse interface 302 receives input signals from a mouse type input device (not shown). The display interface 303 outputs signals for a display (not shown). The LAN interface 304 transmits/receives signals to/from the office LAN circuit. The CPU 305 controls the whole user's desk PC terminal 30. The memory 306 memorizes data necessary for controlling the user's desk PC terminal 30. The clock control portion 307 controls inner time and synchronized signals of the user's desk PC terminal 30.

Next, an operation of the communication exchanging system of FIG. 1 will be described in more detail with reference to FIGS. 1 to 6.

The user beforehand accesses the exchanger 20 from the user's desk PC terminal 30 or the user's desk telephone terminal 31 according to a prescribed procedure, and conducts user's registration. In this event, the user may set a call back flag to the exchanger 20 if necessary. When the user's desk PC terminal 30 is used for the user's registration and/or the setting of the call back flag, it executes a user's registration program for instance. In this case, the user only have to input necessary data into the user's desk PC terminal 30 according to instruction of the user's registration program executed by the user's desk PC terminal 30. Alternatively, when the user's desk telephone terminal 31 is used for the user's registration and/or the setting of the call back flag, the user only have to push buttons of the user's desk telephone terminal 31 according to predetermined procedure. Afterwards, the contents of the user's registration can be changed by similar way at any time.

The exchanger 20 accepts the user's registration and associates inputted user's ID number with an address or a telephone number of the terminal used for the user's registration. The user's ID number and the associated address or telephone number are memorized in the memory 206. The address of user's desk PC terminal 30 and the telephone number of the user's desk telephone number 31 are related with each other in advance, and they are memorized in the memory 206. Accordingly, the user's ID is related to both of the address of the user's desk PC terminal 30 and the telephone number of the user's desk telephone number 31 by associating the user's ID number with either the address of the user's desk PC terminal 30 or the telephone number of the user's desk telephone terminal 31. The exchanger 20 further produces a forwarding destination table (see FIG. 4) for each user and memorized it in the memory 206. The forwarding destination table represents relationships between presence of the user and forwarding destinations (or connecting destinations). Moreover, the exchanger 20 changes contents of a call back management table (see FIG. 5) memorized in the memory 206 according to the setting of the call back flag. In addition, the exchanger 20 adds an item for the accepted user's ID number to a presence state table (see FIG. 6) for managing presence state of all users.

FIG. 4 shows an example of the forwarding destination table for each user. As shown in FIG. 4, the forwarding destination table includes columns 401–404 for presence state, a kind(s) of forwarding destination, a forwarding destination telephone number(s)/address(es), and an a server address(es).

In each cell of the column 401, a user's presence state is registered. An entry of "At DESK" represents that the user is at the user's desk or its vicinities. Entries of "OUT OF OFFICE" and "IN COUNCIL" represent that the user is out of the office and at the meeting room respectively. As another user's presence state, there is "AT HOME" representing that the user is at home or goes home.

In each cell of the column 402, a kind(s) of the forwarding destination(s) corresponding to the user's presence state is registered. Similarly, a forwarding destination telephone number(s) or a forwarding destination E-mail address(es) corresponding to the user's presence state is registered in each cell of column 403. When the forwarding destination is over the Internet 100, the external IM server 45 or the external mail server 47 is necessary for forwarding. In each cell of the column 404, the address of the external IM server 45 or the external mail server 47 necessary for forwarding is registered.

FIG. 5 shows an example of the call back management table. As shown in FIG. 5, the call back management table includes columns 501–503 for a user's ID number, a call back flag and a call-back execution state flag.

In cells of the column 501, user's ID numbers individually assigned the users are registered. In each cell of the column 502, a state of a call back flag corresponding to each user is registered. The call back flag represents whether to do a call back operation to the corresponding user when the forwarding side terminal does not respond. In each cell of the column 503, a state of call back execution state flag corresponding to each user is registered. The call back execution state flag represents whether the call back operation is being made.

FIG. 6 shows an example of the presence state table. As shown in FIG. 6, the presence state table includes columns 601–604 for a user's ID number, presence state, an IM account and an E-mail account.

In cells of the column 601, the user's ID numbers individually assigned to the users are registered. In each cell of the column 602, the user's presence information representing the user's presence is registered as a user's presence state. An entry of "ON PHONE" of the column 602 represents that the user is at the user's desk and on the phone. In each cell of the column 603, an IM account(s) assigned to the corresponding user is registered. Similarly, in each cell of the column 604, an E-mail account(s) assigned to the corresponding user is registered. The IM account(s) may be for the external IM server 45 or (/and) the office IM server 36. Similarly, the E-mail account(s) may be for the external mail server 47 or (/and) the office mail server 38.

After the user executes the user's registration, the user notifies the user's presence change to the exchanger 20 whenever the user's presence is changed. The notification is made by means of a management software resident in the user's desk PC terminal 30 manually or automatically. The notification can be made by the use of the user's desk telephone terminal 31. At any rate, the notification is automatically made or can be made by easy operation, such as pushing one key (or button) or a few keys.

When the user executes the presence change operation with the user's desk PC terminal 30 or the user's desk telephone terminal 31, the presence change operation is notified to the CPU 305 through the keyboard interface 301 and/or the mouse interface 304. The CPU 305 notifies the presence change to the exchanger 20 through the LAN interface 304.

Upon receiving the notification of the presence change through the LAN interface 202, the exchanger 20 rewrites the contents (i.e. the presence state registered in the cell, corresponding to the user, of the column 602) of the presence state table of FIG. 6. After that, the exchanger 20 operates according to the contents of the presence state table as described below.

When the exchanger 20 receives a call for the user's desk telephone terminal 31 from the calling telephone terminal 42 through the PSTN 110, it retrieves the user's ID number related to the telephone number of the user's desk telephone terminal 31 from the memory 206. The exchanger 20 refers to the presence state table to retrieve the presence state corresponding to the retrieved user's ID number. Subsequently, the exchanger 20 refers to the forwarding destination table for the user and decides a forwarding means (or communication means such as the PB mobile terminal 33, the E-mail, or the instant message) according to the retrieved presence state. Finally, the exchanger 20 forwards the call to the decided forwarding means.

When the instant message or the E-mail for the user's desk PC terminal 30 arrives in the office IM server 36 or the office mail server 38 through the Internet 100, the internal IM client portion 209 or the internal mail client transmitting server 210 detects the arrival of the instant message or the E-mail. The CPU 207 decides the forwarding means (an E-mail for the mobile telephone 44, a telephone call for the PB mobile terminal 33, an instant message for the home's terminal 43 or the like) according to the presence state corresponding to the destination of the detected instant message or the detected E-mail. If necessary, the CPU 207 converts the instant message detected by the internal IM client portion 209 or the E-mail detected by the internal mail client transmitting server 210 into a suitable form for the decided forwarding means. Then the CPU 207 forwards the detected instant message or the detected E-mail with the decided forwarding means.

Thus, the communication exchanging system can forward the call for the user's desk PC terminal 30 or the user's desk telephone terminal 31 to the other terminal (or the other telephone terminal). This is achieved by only manual (or automatic) notification of the user's presence change. Accordingly, it is unnecessary for the user to set a forwarding destination when the user presence is changed. The forwarding of the call is made with suitable forwarding (or communication) means in the communication exchanging system.

Hereinafter, the description will be made about examples of the operation of the communication exchanging system.

EXAMPLE 1

Figure 7:
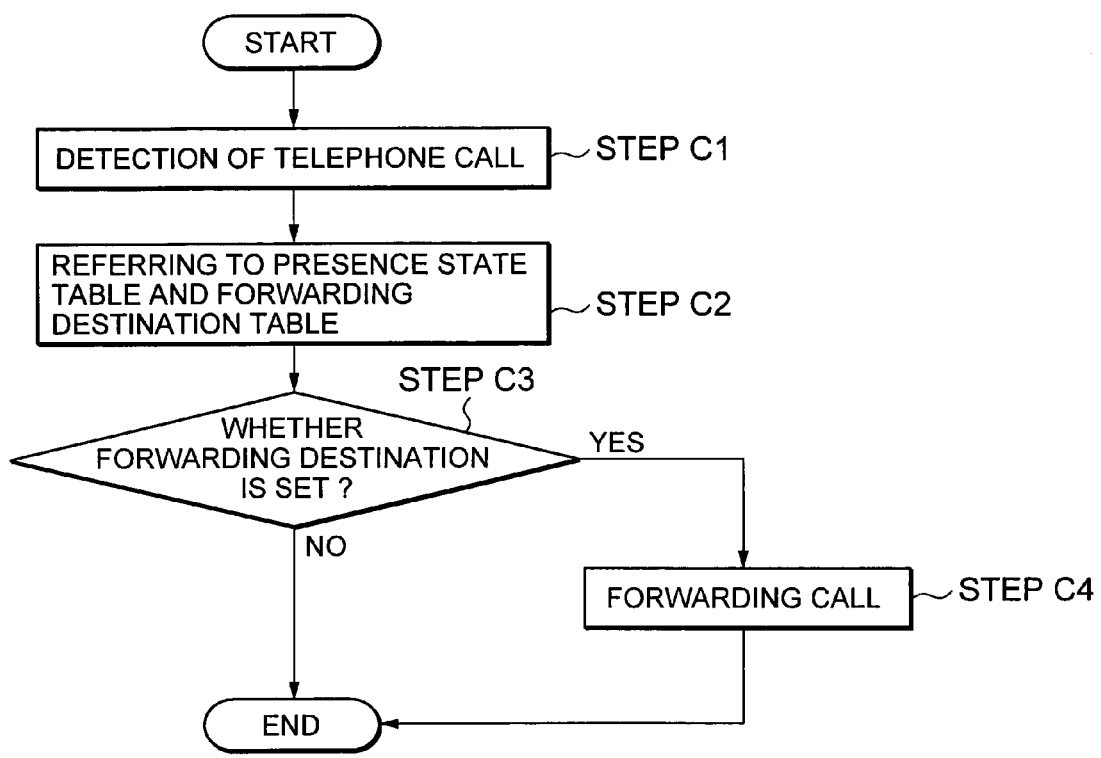
FIG. 7 is a flowchart for describing an operation of the communication exchanger in a case where a telephone call for a user's desk telephone terminal is forwarded to another telephone terminal.

Referring to FIG. 7 in addition to FIGS. 1 to 6, the operation of a case where a telephone call for the user's desk telephone terminal 31 is forwarded to the other telephone terminal is described below.

When the calling telephone terminal 42 generates a telephone call for the user's desk telephone terminal 31, the PSTN interface 201 of the exchanger 20 detects the telephone call through the PSTN 110 (Step C1). The CPU 207 of the exchanger 20 reads out the presence state of the (destination) user related to the user's desk telephone terminal 31 from the column 602 of the presence state table (FIG. 6) in the memory 206. The CPU 207 further reads out the forwarding destination information corresponding to the presence state read out from the columns 402–404 of the forwarding destination table (FIG. 4) corresponding to the user (Step C2). The CPU 207 decides whether the forwarding destination information is registered in the corresponding cell of the column 402 (Step C3). After the CPU 207 confirms that the forwarding destination information is registered in the corresponding cell of the column 402, it forwards the received telephone call to the address registered in the corresponding cell of the column 403 (Step C4). For instance, it is assumed that the telephone number of the mobile phone 44 is set as the forwarding destination information in the corresponding cell of the column 403. In this case, the CPU 207 dials the telephone number of the mobile phone 44 to call the mobile phone 44 of a forwarding side terminal through the PSTN interface 201. When the mobile phone responds to the call from the CPU 207, the CPU 207 connects the mobile phone 44 to the calling telephone terminal 42 through the PSTN interface 201. Thus, the forwarding operation is completed.

According to the example 1, by only changing the presence information in the presence state table, suitable forwarding destination is decided (or selected). It is unnecessary for the user to set the forwarding destination when the user's presence is changed. Setting of the forwarding destination is troublesome task. The forwarding of the call is made through suitable communication means by the communication exchanging system.

EXAMPLE 2

Though the forwarding source (or calling terminal) and the forwarding destination are telephone (using audio) in the example 1, they may be other communication means such as the E-mail, the instant message or the like.

If the E-mail address or the IM address is set as the forwarding destination information in a case where the user is in conference, the conference can be prevented being interrupted with the telephone call. Moreover, if a mail address of the mobile phone 44 is set as the forwarding destination information, the user can know immediately arrival and contents of the E-mail or the instant message for the user's desk PC terminal 30.

To realize the forwarding operation as mentioned above, the CPU 207 of the exchanger 20 refers to the column 402 of the forwarding destination table for the corresponding user and confirms registration of the forwarding destination information whenever the contents of the presence state table (FIG. 6) is changed.

If the forwarding destination information of the corresponding cell of the column 402 is different from the IM address (herein, it is the telephone number or the E-mail address), the CPU 207 of the exchanger 20 activates the internal IM client portion 209. The internal IM client portion 209 can be activated for each user. When N (N: natural number) users register the forwarding destination in formation different from the IM address at the forwarding destination tables, the internal IM client portion 209 is activates N times and serves as N clients for the N users.

When the internal IM client portion 209 is activated, it reads out the IM account of the corresponding user from the column 603 of the presence state table (FIG. 6). The IM account includes an IM server address (i.e. an address of the external IM server 45 or the office IM server 36), an ID number and a password. The internal IM client portion 209 logs on the IM server 45 or 36 corresponding to the IM server address included in the read out IM account by the use of the ID number and the password included in the read out IM account. Hereinafter, it is assumed that the internal IM client portion 209 logs on the office IM server 36.

On the other hand, when the forwarding destination information of the corresponding cell of the column 402 is different from the E-mail address (herein, it is the telephone number or the IM address), the CPU 207 of the exchanger 20 activates the internal mail client transmitting server 210. The internal mail client transmitting server 210 can be activated for each user like the internal IM client portion 209. When N (N: natural number) users register the forwarding destination information different from the E-mail address in the forwarding destination tables, the internal mail client transmitting server 210 is activated N times and serves as N clients for the N users.

When the internal mail client transmitting server 210 is activated, it reads out the E-mail account of the corresponding user from the column 604 of the presence state table (FIG. 6). The E-mail account includes a mail server address (i.e. an address of the external mail server 47 or the office mail server 38), an ID number and a password. The internal mail client transmitting server 210 accesses the mail server 47 or 38 corresponding to the mail server address included in the read out E-mail account by the use of the ID number and the password included in the read out E-mail account to retrieve E-mails for the corresponding user at regular intervals. Hereinafter, it is assumed that the internal mail client transmitting server 210 retrieves E-mails from the office mail server 38.

In the condition where the exchanger 20 operates as mentioned above, it is assumed that the originating PC terminal 41 transmits the instant message for the user's desk PC terminal 30 and that the forwarding destination of the user's desk PC terminal is set to the E-mail address.

In this case, the instant message sent from the originating PC terminal 41 to the office IM server 36 through the Internet 100 is sent to the internal IM client portion 209 (Step C1). Upon receiving a reception notification of the instant message from the internal IM client portion 209, the CPU 207 of the exchanger 20 reads out the presence state of the destination user from the corresponding cell of the column 602 of the presence state table (FIG. 6) in the memory 206. The CPU 207 further reads out the forwarding destination information corresponding the read out presence state from the columns 402–404 of the forwarding destination table (FIG. 4) for the destination user (Step C2). The CPU 207 decides whether the forwarding destination information is set in the corresponding cell of the column 402 (Step C3). The CPU 207 forwards the instant message to the E-mail address registered at the corresponding cell of the column 403 when it confirms registration of the forwarding destination information (Step C4).

If the E-mail address of the mobile phone 44 as the forwarding destination information is set in the corresponding cell of the column 403 of the forwarding destination table, the CPU 207 of the exchanger 20 produces a forwarding E-mail having a body consisting of contents of the received instant message and a destination of the E-mail address of the mobile phone 44. The CPU 207 transmits the forwarding E-mail to the internal mail client transmitting server 210. Upon receiving the forwarding E-mail, the internal mail client transmitting server 210 transmits it to the external mail server 47 exercising jurisdiction over the E-mail address of the mobile phone 44 through the LAN interface 201. The forwarding E-mail is transmitted from the external mail server 47 to the mobile phone 44 through the PSTN 110 (including a gateway or the like of a mobile phone company).

Next, in similar condition as mentioned above, it is assumed that the originating PC terminal 41 transmits the E-mail for the user's desk PC terminal 30 and that the forwarding destination information is set to the IM address.

In this case, the E-mail sent from the originating PC terminal 41 to the office mail server 38 through the Internet 100 is retrieved by the internal mail client transmitting server 210 (Step C1). Upon receiving a reception notification of the E-mail from the internal mail client transmitting server 210, the CPU 207 of the exchanger 20 reads out the presence state of the destination user from the column 602 of the presence state table (FIG. 6) of the memory 206. The CPU 207 further reads out the forwarding destination information corresponding the read out presence state read out from the columns 402–404 of the forwarding destination table (FIG. 4) for the destination user (Step C2). The CPU 207 decides whether the forwarding destination information is set in the corresponding cell of the column 402 (Step C3). The CPU 207 forwards the E-mail to the IM address registered at the corresponding cell of the column 403 when it confirms registration of the forwarding destination information (Step C4).

When the IM address subject to the office IM server 36 as the forwarding destination information is set in the corresponding cell of the column 403 of the forwarding destination table, the CPU 207 of the exchanger 20 converts a body of the E-mail into a body for the instant message and produce a forwarding instant message having the body for the instant message and a destination of the IM address subject to the office IM server 36. The CPU 207 transmits the forwarding instant message to the transmitting/monitoring internal IM client portion 211. Upon receiving the forwarding instant message, the transmitting/monitoring internal IM client portion 211 transmits it to the office IM server 36 through the LAN interface 201.

According to the Example 2, the call can be forwarded even if it is the E-mail or the instant message and if the forwarding destination information is set to different kind of the communication means. When the call is the E-mail or the instant message and when the forwarding destination information is the telephone number, the exchanger 20 converts the body of the E-mail or the instant message into voice or audio by the use of voice synthesis. The exchanger 20 forwards the voice instead of the E-mail or the instant message. On the contrary, when the call is the telephone call and when the forwarding destination information is set to the E-mail address or the instant message address, the exchanger 20 converts voice into a text and produce an E-mail or an instant message having a body consist of the text. The exchanger 20 forwards the E-mail of the instant message instead of the voice.

EXAMPLE 3

There is a case where the user can not respond to the forwarding call forwarded as mentioned in Example 1. In such a case, the exchanger 20 may executes a call back operation when it detects change of the presence state of the corresponding user.

Figure 8:
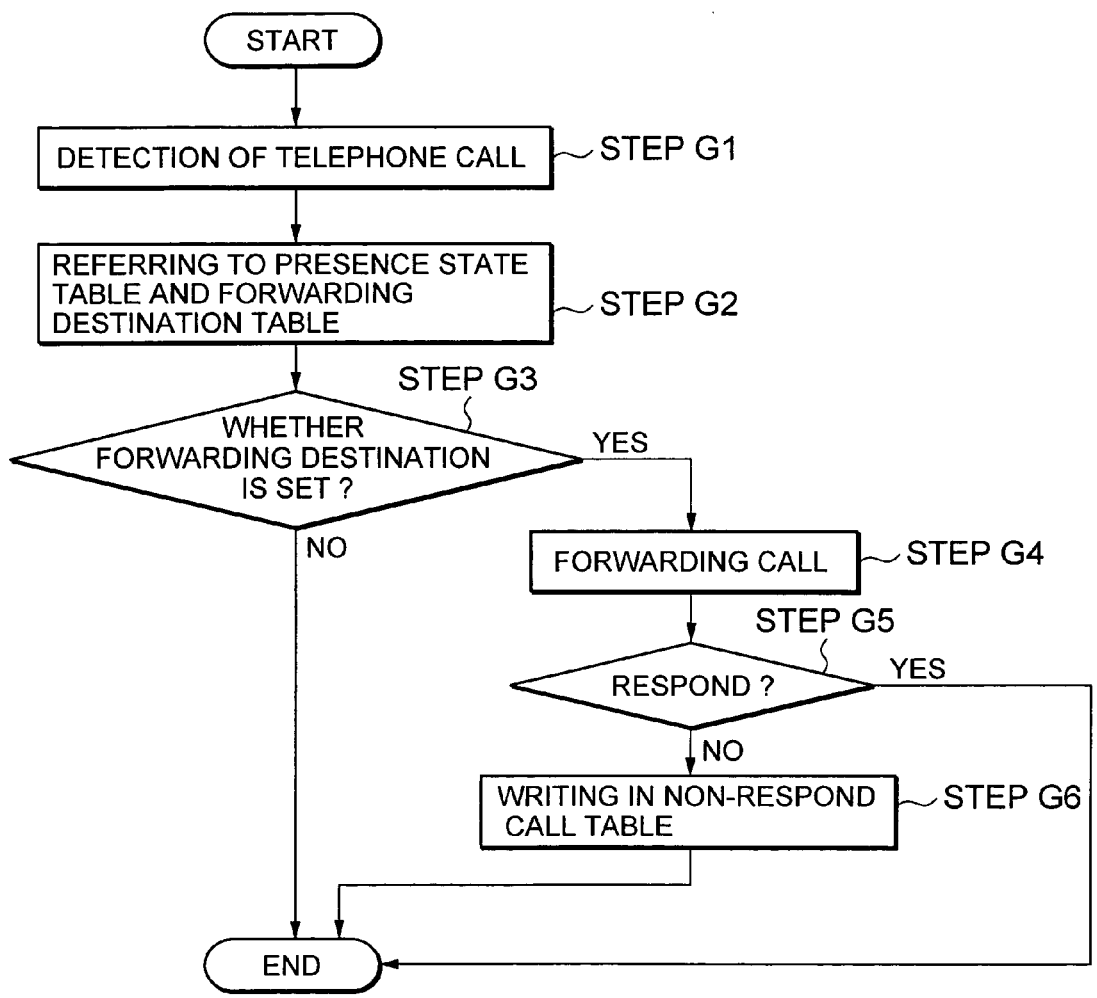
FIG. 8 is a flowchart for describing an operation of the communication exchanger in a case where setting is made for a call-back operation.

The exchanger 20 operates as illustrated in FIG. 8 to execute the call back operation. The steps G1 to G4 of FIG. 8 are similar to the steps C1 to C4 of FIG. 7.

In the step G4, the moment the exchanger 20 forwards the call, it starts counting elapsed time. When the forwarding side terminal responds to the forwarding call during a predetermined time period, the exchanger 20 connects the forwarding side terminal (e.g. the mobile phone 44) with the calling telephone terminal 42 as mentioned in relation to the Example 1. After that, the exchanger 20 decides that the forwarding side responded (Yes in Step G5), and finishes the forwarding operation.

On the other hand, when the forwarding side terminal does not respond to the forwarding call during the predetermined time period (No in the Step G5), the CPU 207 of the exchanger 20 writes the telephone number of the calling telephone terminal 42 in the non-responding call table (FIG. 9) of the corresponding user. In this regard, when the telephone number which is to be written is already written in the non-responding call table, the CPU 207 does not execute the write operation.

Figure 9:
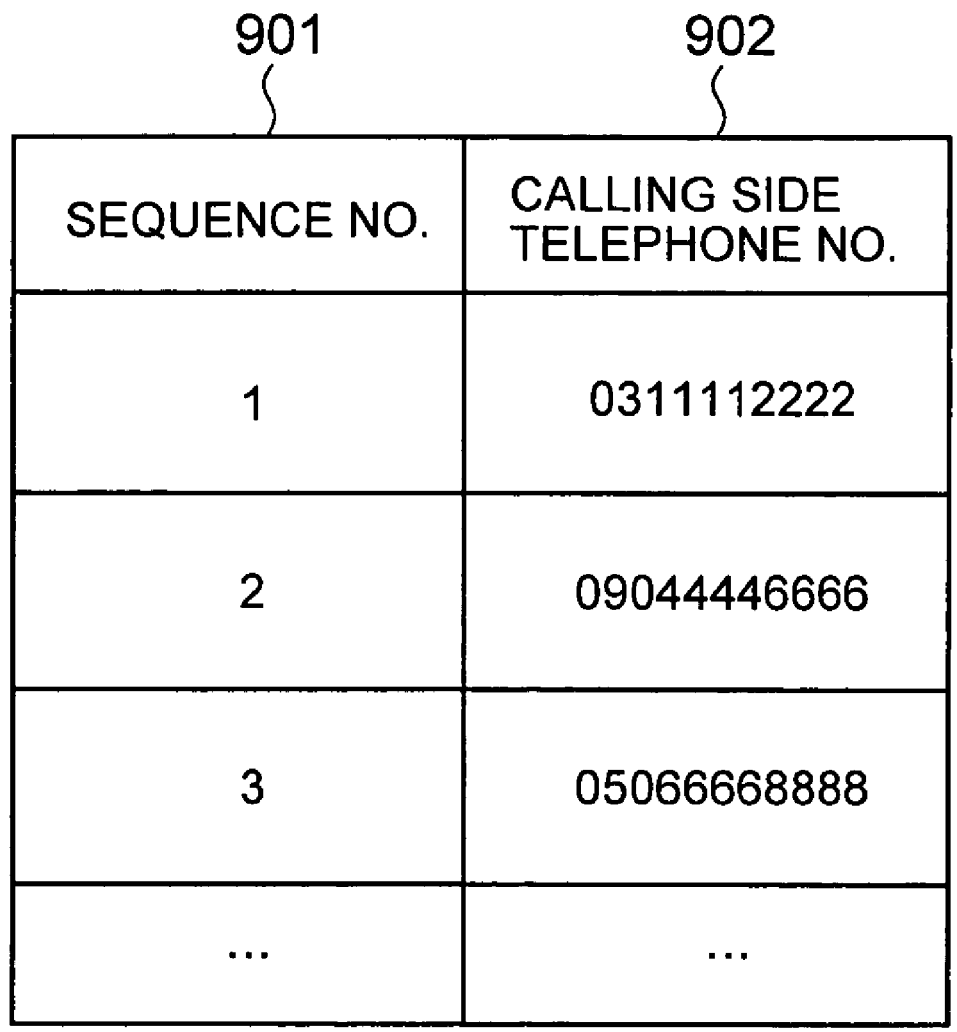
FIG. 9 shows an example of a non-responding call table for each user memorized in the memory of the communication exchanger.

FIG. 9 is an example of the non-responding call table for each user. The illustrated table includes a sequence number column 901 and a calling side telephone number column 902. The exchanger 20 writes the telephone number in a blank cell of the calling side telephone number column 902, when it detects that the forwarding side terminal does not respond.

Figure 10:
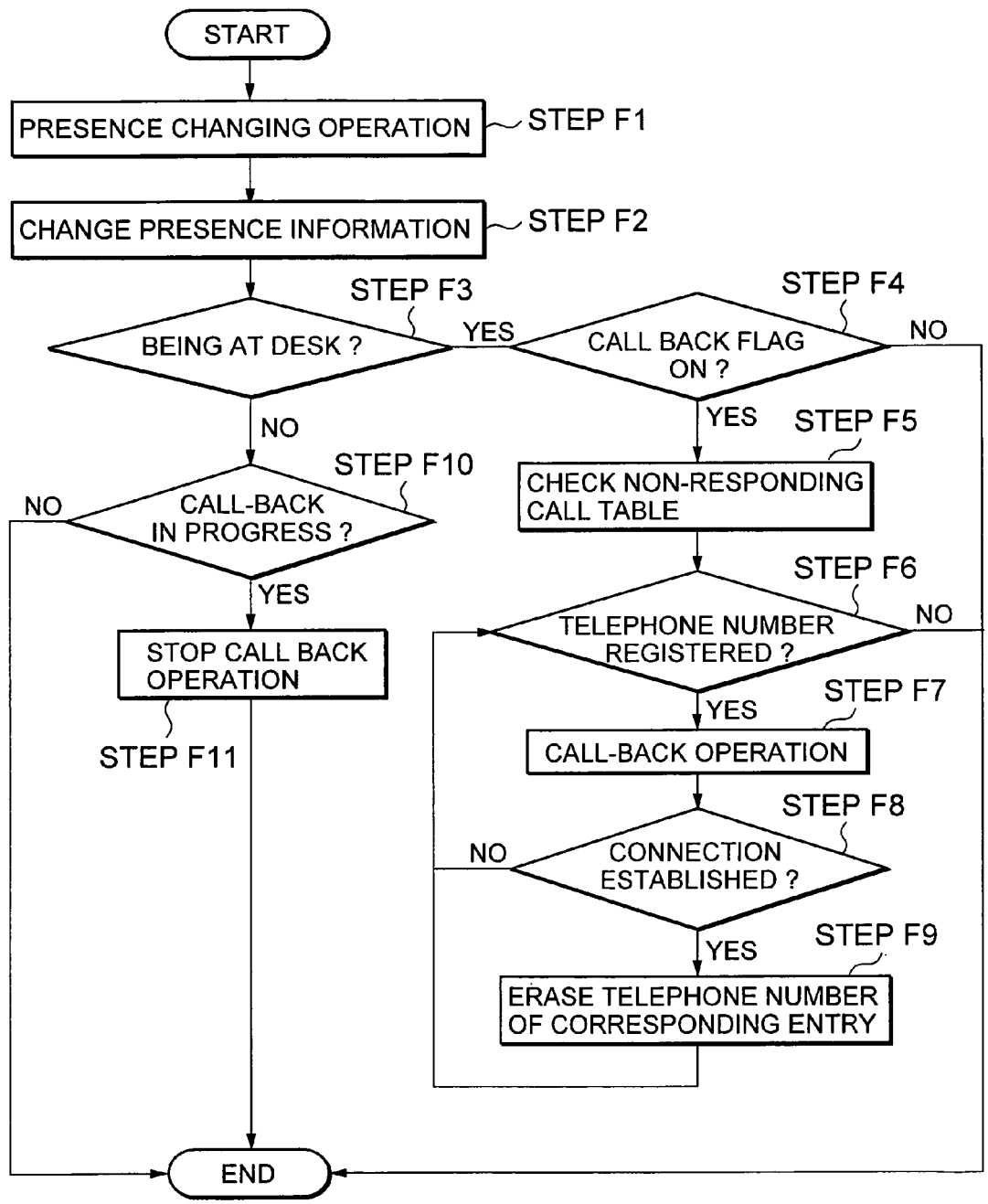
FIG. 10 is a flowchart for describing the call-back operation of the communication exchanger.

After at least one telephone number is registered in the non-responding call table, the exchanger 20 executes the call back operation. The call back operation of the exchanger 20 will be described in reference to the flowchart of FIG. 10.

At first, the user executes the presence changing operation by the use of the user's desk PC terminal 30 (or the user's desk telephone terminal 31). The presence changing operation is detected by the CPU 305 of the user's desk PC terminal 30 (or the user's desk telephone terminal 31) through the keyboard interface 301 and/or the mouse interface 302 (Step F1). The CPU 305 notifies the presence change to the exchanger 20 through the LAN interface 304. The exchanger 20 receives the notification of the presence change through the LAN interface 202 and rewrites the presence state in the corresponding cell of the column 602 of the presence state table (Step F2).

The exchanger 20 decides whether the rewritten presence state represents that the user is at the user's desk or its vicinities (Step F3) When the present state represents that the user is at the user's desk or its vicinities, the exchanger 20 further decides whether to execute the call back operation for the user according to the call back management table (FIG. 5). When the call back flag is on state (Yes in Step F4), the exchanger 20 checks the column 902 of the non-responding call table for the corresponding user (Step F5). When the call back flag is off state (No in Step F4), the exchanger 20 finishes the call back operation.

When the call back flag is the on state and when the calling side telephone number is registered in the non-responding call table for the corresponding user (Yes in Step F6), the CPU 207 of the exchanger 20 sets the call back execution flag of the corresponding cell of the column 503 of the call back management table to the on state and then executes the call back operation (Step F7).

Concretely, the CPU 207 of the exchanger 20 dials the calling side telephone number written in the non-responding call table through the PSTN interface 201. IF the calling side telephone terminal 42 responds, the CPU 207 calls the user's desk telephone terminal 31. When the user's desk telephone terminal 31 responds to the call, the CPU 207 connects the user's desk telephone terminal 31 with the calling telephone terminal 42.

It is possible that the user's desk telephone terminal 31 does not respond though the calling telephone terminal 42 responds to the call back. To avoid such a situation, the exchanger 20 may dial the calling side telephone terminal 42 after the user's desk telephone terminal 31 responds to the call.

When the connection is established (Yes in Step F8), the CPU 207 of the exchanger 20 erases the calling side telephone number from the corresponding cell of the column 902 of the non-responding call table memorized in the memory 206 (Step F9). In succeeding, the CPU 207 returns to the step F6 and decides whether other calling side telephone number is registered in the non-responding call table. If the other calling side telephone number is registered in the non-responding call table, the CPU 207 executes the call back operation for the other calling side telephone number. If not, the CPU 207 finishes the operation.

In the step F8, when the connection is not established before predetermined time elapses, the CPU 207 stops the call-back operation. That is, when the calling side telephone terminal or the user's desk telephone terminal 42 does not responds during a predetermined time period, the CPU 207 stops the call for the calling side telephone terminal or the user's desk telephone terminal. At this time, the CPU 207 sets the corresponding cell of the column 503 of the call back management table to the off state. Then, the CPU 207 returns to the step F6 and operates as mentioned above.

Until the connection is established, the call back operation may be repeated to the same calling side telephone terminal 42. The CPU 207 may executes the call back operation to the same calling side telephone terminal 42 after predetermined time elapses from the last time so that the calling side telephone terminal 42 would not be called many times in a relative short time.

The step F3 advance to the step F10 when the rewritten presence state does not represents that the user is at the user's desk or its vicinities. In the step F10, the CPU 207 decides whether the call back operation is executed in reference to the call-back management table.

When the call back operation is in progress, the CPU 207 stops it and sets the corresponding cell of the column 903 of the call-back management table to the off state (Step F11) This is to prevent the presence changing operation and the call back operation from being executed in parallel in a case where the presence changing operation is made during the call back operation is executed.

According to the example 3, when the user returns to the user's desk, the call back operation is made automatically.

EXAMPLE 4

In each of the Example 1 to 3, the presence state of the presence state table is manually changed by the use of the user's desk PC terminal 30 or the user's desk telephone terminal 31. However, the presence state of the presence management table can be automatically changed by detecting specific state, such as activation and/or shutdown of the user's desk PC terminal 30, absence of input to the keyboard or the mouse of the user's desk PC terminal 30 during a predetermined time, change of presence state of an instant message service and so on. Hereby, the call can be forwarded to the suitable forwarding destination without not only manual setting of the forwarding destination but also manual presence changing operation.

To execute the presence changing operation automatically, special application program for the presence changing operation is previously installed in the user's desk PC terminal 30. The user's desk terminal 30 is set so that the special application program is automatically started by a function of an operating system of the user's desk PC terminal 30.

When the special application program runs, the user's desk PC terminal 30 allows registration of various information to be notified to the exchanger 20 into a user's desk management table memorized in the memory 306 at any time. The various information includes the user's presence information representing the change of the user's presence, such as coming to the office, leaving from the office, leaving from the user's desk and so on. The various information further includes necessary information, such as a reference time for judging the leaving the user's desk. When the user's presence information is registered in the user's desk management table, the user's desk PC terminal 30 detects the user's presence and notifies the detected user's presence to the exchanger 20.

Figures 11, 12:
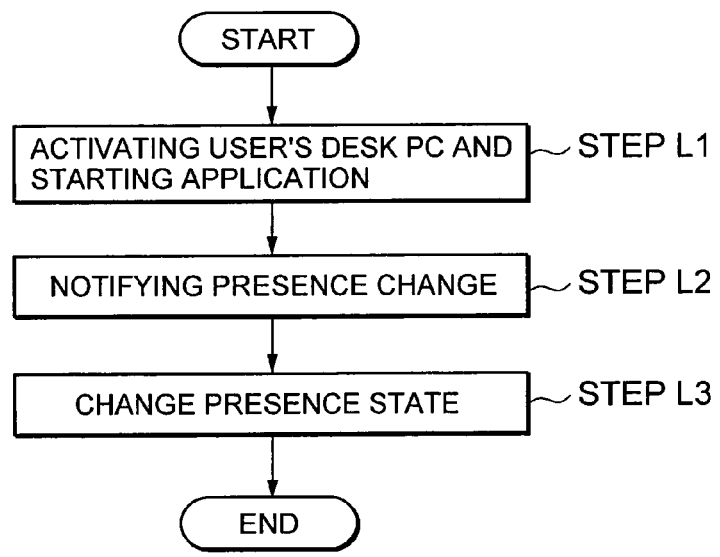
FIG. 11 shows an example of a user's desk management table memorized in a memory of the user's desk personal computer terminal of FIG. 3.
FIG. 12 is a flowchart for describing an automatic changing operation of the presence information when the one's personal computer terminal is started.

FIG. 11 shows an example of the user's desk management table. The illustrated user's desk management table includes column 1101–1103 for the user's presence of the coming to the office, of the leaving from the office, and of the leaving from the user's desk. Furthermore, the user's desk management table of FIG. 11 includes a column 1104 for the reference time for judging the leaving from the user's desk and a column 1105 for a counter counting a time during the leaving from the user's desk.

The presence changing operation using the special application program will be described with regard to the coming to the office, the leaving from the user's desk and the leaving from the office in reference to FIGS. 12, 13 and 14, respectively.

Referring to FIG. 12, when the user activates the user's desk PC terminal 30, the user's desk PC terminal 30 starts the special application program (Step L1). The special application program is resident in the user's desk PC terminal 30 after the startup.

Next, the special application program retrieves the presence information from the entry 1101 of the user's desk management table and notifies the presence change by using the presence information to the exchanger 20 through the LAN interface 304 (Step L2).

Upon receiving the notification of the presence change from the user's desk PC terminal 30 through the LAN interface 202, the exchanger 20 rewrites the corresponding cell of the column 602 of the presence state table according to the notification (Step L3).

Thus, the contents of the presence state table are automatically changed in response to coming to the office of the user.

Figure 13:
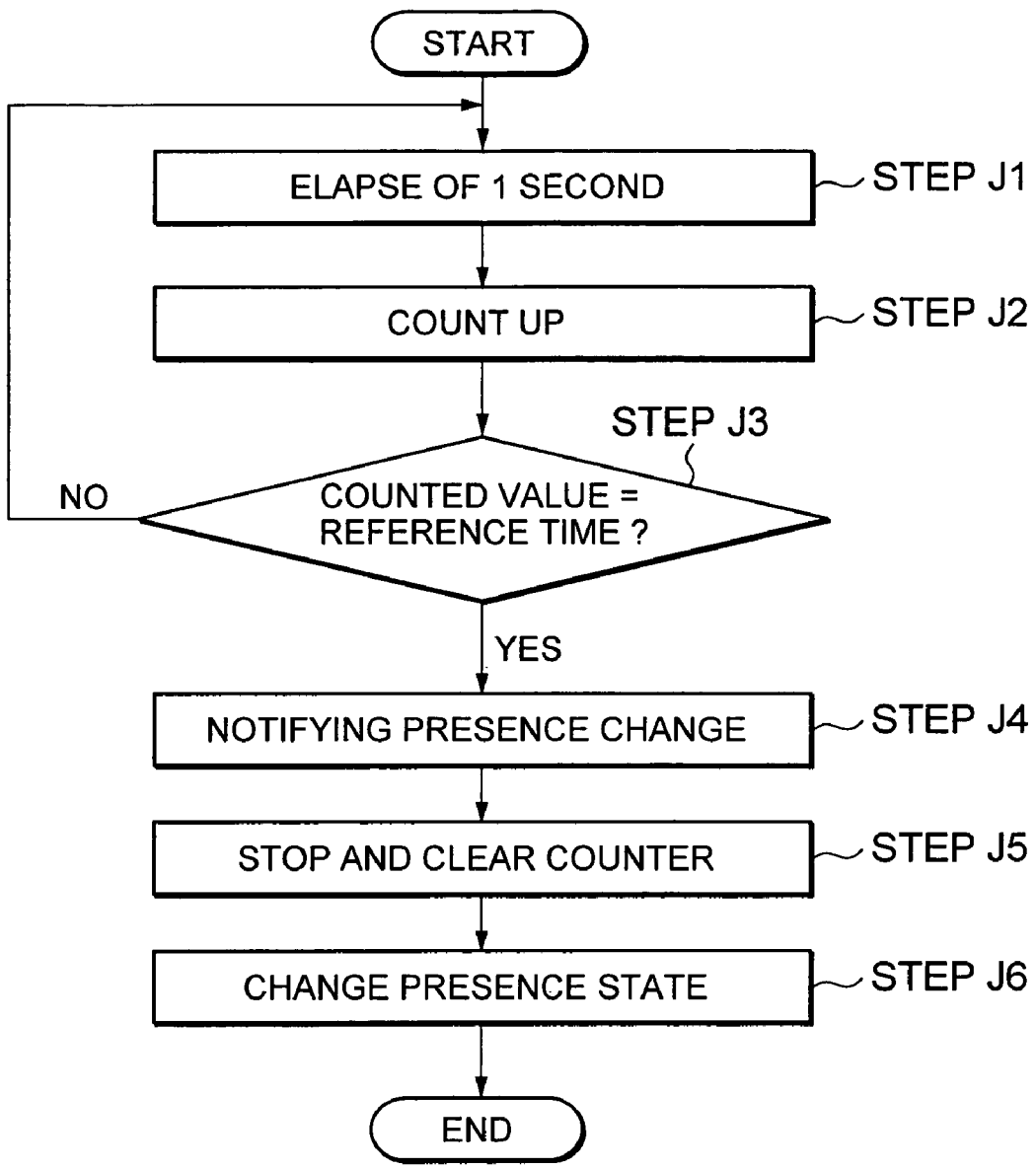
FIG. 13 is a flowchart for describing an automatic changing operation of the presence information when the user's desk personal computer terminal detects absence.

Referring to FIG. 13, the description will be made about the presence changing operation of a case where the user leaves from the desk.

After the special application program is started, it controls the clock control portion 307 to count elapsed time. That is, the special application program increases the value of the column 1105 of the user's desk management table by one whenever one second elapses (Steps J1 and J2). Whenever the counted value of the column 1105 is increased, the special application program compares the value of the column 1105 with the value (i.e. the reference time) of the column 1104 of the user's desk management table (Step J3). The steps J1 to J3 are repeated until the value of the column 1105 is equal to the value of the column 1104. However, the counted value of the column 1105 is returned to zero when the user handles the keyboard or the mouse. This is made by the CPU 305 of the user's desk PC terminal 30. The CPU 305 detects the handling of the keyboard and the mouse through the keyboard interface 301 and the mouse interface 302 respectively.

When the counted value of the column 1105 reaches to the value of the column 1104, the special application program sends the presence information registered in the column 1103 as the notification of the presence change for the exchanger 20 through the LAN interface 304 (Step J4). Subsequently, the special application program stops counting the elapsed time and brings the value of the column 1105 back to zero (Step J5).

Upon receiving the notification of the presence change from the user's desk PC terminal 30 through the LAN interface 202, the exchanger 20 rewrites the corresponding cell of the column 602 of the presence state table according to the notification (Step J6).

Thus, the contents of the presence state table in the exchanger 20 are automatically changed in response to the notification from the user's desk PC terminal 30, which detects the leaving of the user from the user's desk, to the exchanger 20.

Figure 14:
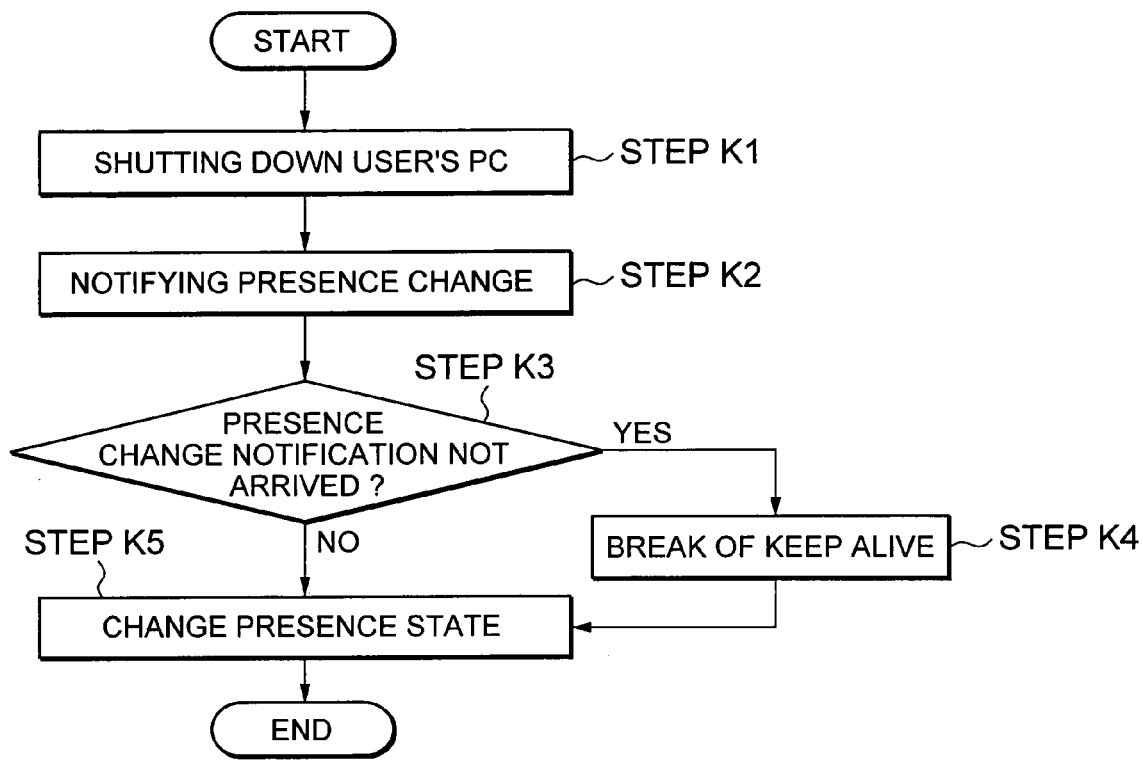
FIG. 14 is a flowchart for describing an automatic changing operation of the presence information when the user's desk personal computer terminal executes a shut down operation.

Referring to FIG. 14, the presence changing operation will be described in regard to the leaving of the user from the office. Herein, the special application executes mutual ascertainment of existence (for a keep alive operation) with the exchanger 20 at a regular time interval.

At leaving the office, the user handles the user's desk PC terminal 30 to shut down (Step K1). Consequently, the user's desk PC terminal 30 executes a terminating operation of the special application program. In this event, the special application program notifies the presence information registered in the column 1102 of the user's desk management table as the notification of the presence change to the exchanger 20 through the LAN interface 304 (Step K2).

Upon receiving the notification of the presence change from the user's desk PC terminal 30 through the LAN interface 202, the exchanger 20 rewrites the presence state of the corresponding cell of the column 602 of the presence state table according to the notification (Steps K3 and K5).

Even if the presence change notification from the user's desk PC terminal 30 does not arrive at the exchanger 20 for any causes (Yes in the Step K3), the exchanger 20 can detect that the user's desk PC terminal is shut down. This is because the exchanger 20 can not ascertain the user's desk PC terminal 30 after the user's desk PC terminal 30 is shut down. When the exchanger 20 detects that the user's desk PC terminal 30 is shut down, it also rewrites the presence state of the corresponding cell of the column 602 of the presence state table (Steps K4 and K5). The exchanger 20 also rewrites the presence state of the corresponding cell of the column 602 when the power supply for the user's desk PC terminal 30 is suddenly cut and the special application program can not notify the presence change to the exchanger 20.

Thus, the contents of the presence state table in the exchanger 20 are automatically changed by shutting down of the user's desk PC terminal 30.

EXAMPLE 5

When the IM address is set as the forwarding destination information, the instant message can be forwarded in condition that the user is logging in the office IM server 36 or the external IM server 45. In other words, to forward the instant message, the user must be logging in the IM server 36 or 45. If the user's IM account is registered in a buddy list (or a colleague list) of the transmitting/monitoring internal IM client portion 211, the exchanger 20 can monitor whether the user is logging in the IM server 36 or 45. The exchanger 20 can change the forwarding destination information according to the results of the monitoring of the IM server 36 or 45. Thus, the exchanger 20 can change the forwarding means different from the instant message in condition that the user is logging in neither the office IM server 36 nor the external IM server 45.

Hereafter, the description will be made about a case where the presence state table is automatically changed according to whether the user is logging in external IM server 45.

To realize the above mentioned operation, the user previously registers the IM account used for the external IM server 45 in the presence state table (FIG. 6). The registration of the IM account may be made to the column 603 or another column (not shown) newly provided in the presence state table. Moreover, the user registers an entry of "LOG IN IM" to the column 401 of the forwarding destination table (FIG. 4) for the user. Concretely, entries of "LOG IN IM", "IM", "address of IM client" and "address of the external IM server" are set in the columns 401, 402, 403 and 404, respectively.

The transmitting/monitoring internal IM client 211 of the exchanger 20 previously logs in the external IM server 45 by using account assigned thereto. The transmitting/monitoring internal IM client 211 further registers the IM account(s) of the user(s) registered in the presence state table to the buddy list of the external IM server 45.

Figure 15:
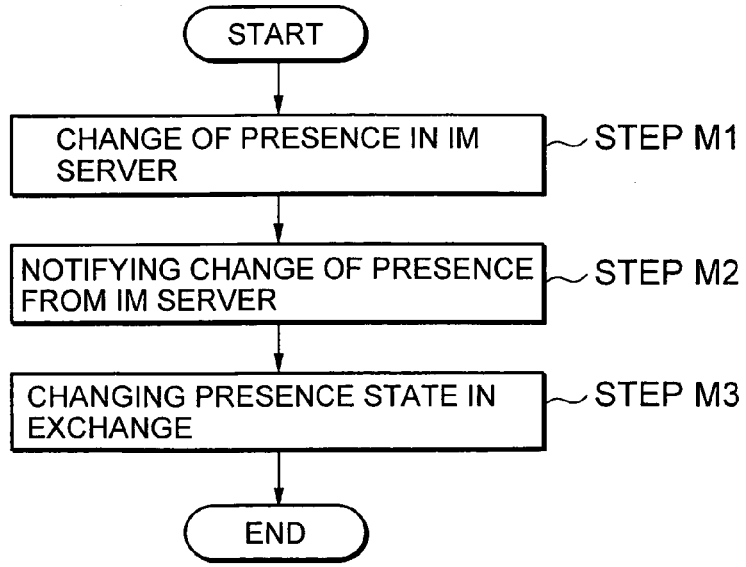
FIG. 15 is a flowchart for describing an automatic changing operation with monitoring an instant message server.

Automatic change of the presence information is executed as illustrated in FIG. 15.

At first, the user who sets the external IM server 45 as the forwarding destination logs in the external IM server 45 by means of the laptop PC/PDA (i.e. IM client) 48 out of the office. Consequently, the presence state of the user in the IM server is changed (Step M1).

The transmitting/monitoring internal IM client 211 which is logging in the external IM server 45 receives login notification of the user from the external IM server 45 (Step M2). This can be made because the IM account of the user is registered in the buddy list related to the transmitting/monitoring internal IM client 211 in the external IM server 45.

Upon receiving the login notification that the user logged in the external IM server 45 from the transmitting/monitoring internal IM client 21, the CPU 207 of the exchanger 20 rewrites the corresponding cell of the column 602 of the presence state table into "LOG IN" (Step M3). Thus, the call for the user is forwarded as the instant message to the laptop PC/PDA 48 which is carried out from the office and which is logging in the external IM server 45.

When the user logs off the external IM server, the exchanger 20 rewrites the corresponding cell of the column 602 of the presence state table into a former state, such as "OUT OF OFFICE", in the way similar to the above mentioned.

EXAMPLE 6

In each of the Examples 1–5, the only one forwarding destination information is set for each presence state of the user. Accordingly, the call for the user can be forwarded to nowhere regardless of existence of another communication means except the forwarding destination when the forwarding to the forwarding destination is impossible for some reason. For instance, it is assumed that the user sets the IM address as the forwarding destination information for the presence of "IN COUNCIL". In this case, if the user is not logging in the office IM server 36 or the external IM server 45, the forwarding of the call can not be executed even though the user can receive E-mails. Therefore, this example provides a method for forwarding the call to plural terminals at the same time by designating the plural terminals as the forwarding destinations.

Previously, each user writes information for designating one or more forwarding destinations in the columns 402–404 of the forwarding destination table in the memory 206 of the exchanger 20 by means of operating the terminal or setting software of the exchanger 20. FIG. 16 shows an example of the forwarding destination table for each user.

Figures 17, 18:
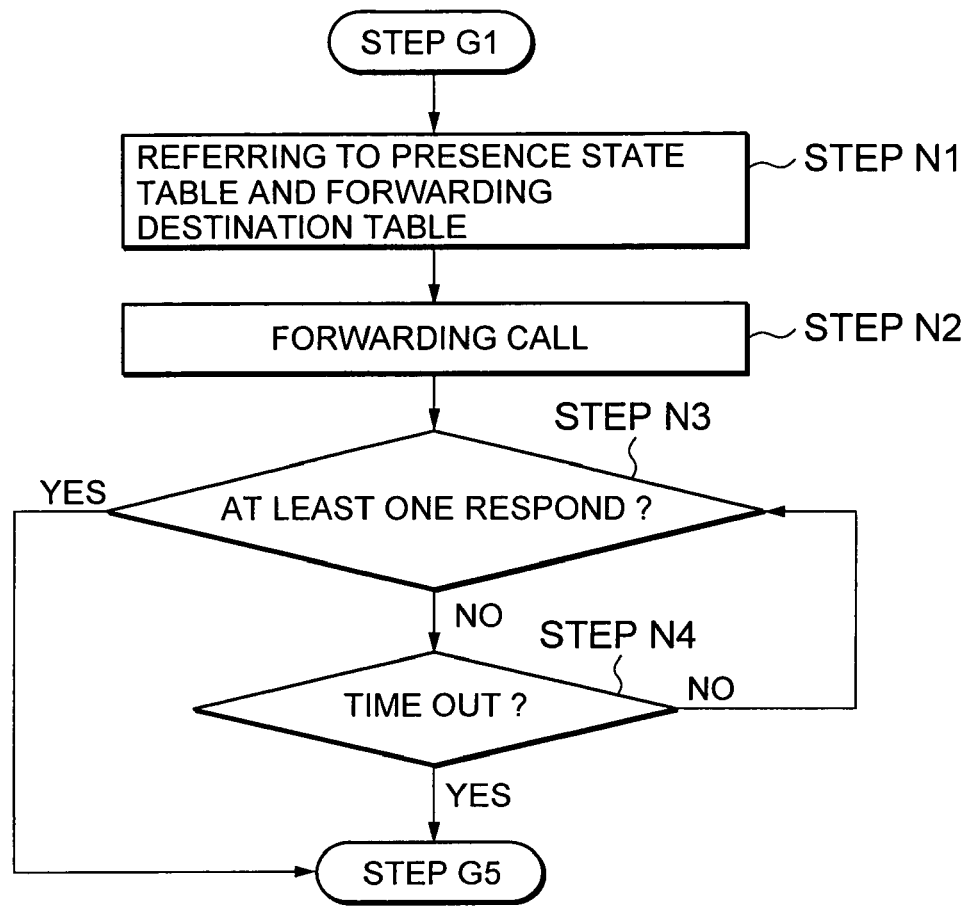
FIG. 17 is a flowchart for describing a forwarding operation of the communication exchanger in the case where the plural forwarding destinations are designated.
FIG. 18 shows a user notification groupware table memorized in the memory included in the communication exchanger.

Referring FIG. 17, the forwarding operation of the system having the forwarding destination table(s) of FIG. 16 will be described. The steps N1–N4 are substitute for the steps G2–G4 of FIG. 8. The step G3 is omitted in FIG. 17 to simplify the description.

When a call from the calling telephone terminal 42 to the user's desk telephone terminal 31 arrives at the exchanger 20 through PSTN 110, the CPU 207 of the exchanger 20 retrieves the presence state of the corresponding user from the column 602 of the presence state table in memory 206. The CPU 207 further retrieves the forwarding destination information representing one or more forwarding destination from the columns 402–404 of the forwarding destination table for the corresponding user according to the retrieved presence information (Step N1).

Next, the CPU 207 forwards the call to all of telephone numbers/addresses represented by the retrieved forwarding destination information at the same time (Step N2). If necessary, the call is converted into different kind(s) of the communication means according to the forwarding destinations.

After that, when the CPU 207 detects responding of at least one terminal in regard to the forwarded call(s), it stops forwarding the call(s) to other terminals (Step N3).

When there is no response to the forwarded call(s) while a predetermined time is elapsed (Step N4), the CPU 207 stops forwarding the call.

According to the example 6, the call can be forwarded to the plural terminals as mentioned above.

EXAMPLE 7

In each of the examples 1–6, the forwarding destination is automatically changed by changing the presence state of the presence state table. However, to change a presence state of a groupware, such as a destination massage board, provided by the office Web server 37 or the external Web server 46, the user must change it manually.

In this example, when the exchanger 20 changes the presence state of the presence state table (FIG. 6), it changes the presence state of the groupware at the same time thereby it is unnecessary that the user changes the presence state of the groupware.

To execute the above mentioned operation, the exchanger 20 provides a notifying destination groupware table for each user in the memory 206. FIG. 18 shows an example of the notifying destination groupware table.

Figure 19:
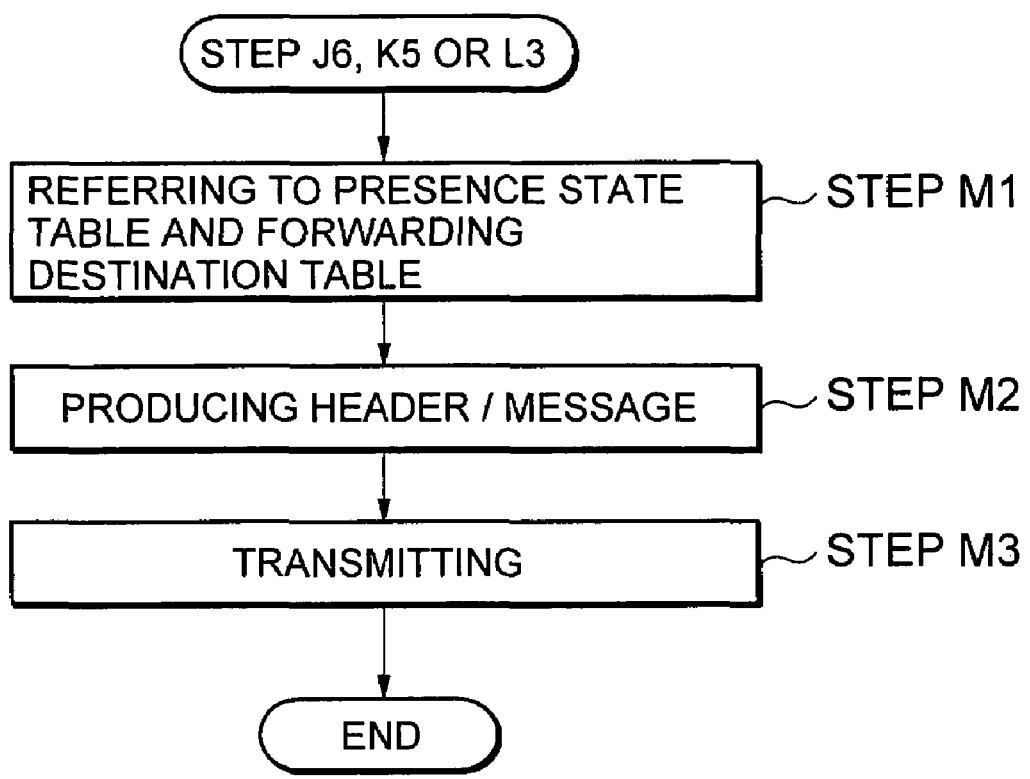
FIG. 19 is a flowchart for describing an operation of the communication exchanger to change presence information of the groupware.

Referring FIG. 19, an operation of the system having the notifying destination groupware table will be described below.

At first, the contents of the presence state table in the exchanger 20 are changed as mentioned in regard to the examples 1–6 (Step M1).

Next, the CPU 207 of the exchanger 20 refers to the notifying destination groupware table memorized in the memory 206 and produces a script (i.e. a combination of a header and a message) for control a Web page of the groupware (Step M2).

Subsequently, the CPU 207 of the exchanger 20 transmits the produced script to the groupware running in the office Web server 37 through the LAN interface 202 (Step M3).

The script transmitted from the CPU 207 looks like the operation made with a normal browser for the office Web server 37. Accordingly, the presence state of the groupware is changed by the script from the exchanger 20.

According to the example 7, by only changing the presence state used for changing the forwarding destination, the presence state of the other service is automatically changed.

While this invention has thus far been described in conjunction with the preferred embodiments thereof, it will readily be possible for those skilled in the art to put this invention into practice in various other manners. For example, the forwarding destination may be the meeting room's terminal 32, the PB mobile terminal 33 or the answering machine 35. Furthermore, the calling terminal is not limited to the originating PC terminal 41 and the calling telephone terminal 42.

What is claimed is:

1. A communication exchanger for plural users comprising:

a memory that includes a respective forwarding destination table for each user, each said forwarding destination table including a list of plural presence states that define plural potential locations and states of the respective user and user-provided communication forwarding instructions for each of the plural presence states;

said memory also including a presence state table for plural users, said presence state table including a list of the plural users and for each of the plural users a current presence state that is one of the plural presence states from a respective said forwarding destination table;

a communication receiving portion that is connected to said memory and receives a communication for a user and, based on an identity of the user, provides the current presence state of the user from said presence state table; and a communication forwarding portion that is connected to said memory and receives the current presence state from said communication receiving portion and retrieves the forwarding destination information from the respective said forwarding destination table based on the current presence state of the user and forwards the received communication in accordance with the communication forwarding instructions in the respective said forwarding destination table.

2. The communication exchanger of claim 1, wherein said communication forwarding portion converts the received communication from a received form to a form that is compatible with the communication forwarding instructions.

3. The communication exchanger of claim 2, wherein said communication forwarding portion converts a received telephone communication to one of an e-mail message and an instant message.

4. The communication exchanger of claim 1, wherein each said forwarding destination table permits designation of a telephone number, an e-mail address and an instant message address in the communication forwarding instructions.

5. The communication exchanger of claim 1, wherein said exchanger automatically changes a forwarding destination according to notification of a presence change of the user, and further comprising a terminal connected to said exchanger for executing the notification of the presence change of the use, wherein said terminal detects the presence change according to a use state thereof.

6. The communication exchanger of claim 1, further comprising an instant message server connected to said exchanger for providing an instant message service allows the user to participate therein, wherein said exchanger participates in the instant message service and monitors whether the user is logging in said instant message server to detect the presence change according to a monitoring result.

7. The communication exchanger of claim 1, wherein said exchanger allows designating one or more additional forwarding destinations for each presence of the user.

8. The communication exchanger of claim 1, wherein said exchanger notifies the presence change to another apparatus.

9. The communication exchanger of claim 1, wherein said exchanger calls back a destination terminal corresponding to the forwarding destination for the presence of "AT DESK" when the presence changes from not "AT DESK" to "AT DESK", in a case where a forwarded-to terminal corresponding to the forwarding destination for the presence of not "AT DESK" does not respond to a forwarded telephone call during a predetermined time period though a telephone call for the destination terminal is forwarded to the forwarded-to terminal as the forwarded telephone call.

10. The communication exchanger of claim 6, wherein said exchanger calls back a destination terminal corresponding to the forwarding destination for the presence of "AT DESK" when the presence changes from not "AT DESK" to "AT DESK", in a case where a forwarded-to terminal corresponding to the forwarding destination for the presence of not "AT DESK" does not respond to a forwarded telephone call during a predetermined time period though a telephone call for the destination terminal is forwarded to the forwarded-to terminal as the forwarded telephone call.

* * * * *